Oct. 20, 1931.   P. A. KOURTZMAN   1,827,988
SPEEDOMETER
Filed Jan. 31, 1929   5 Sheets-Sheet 2
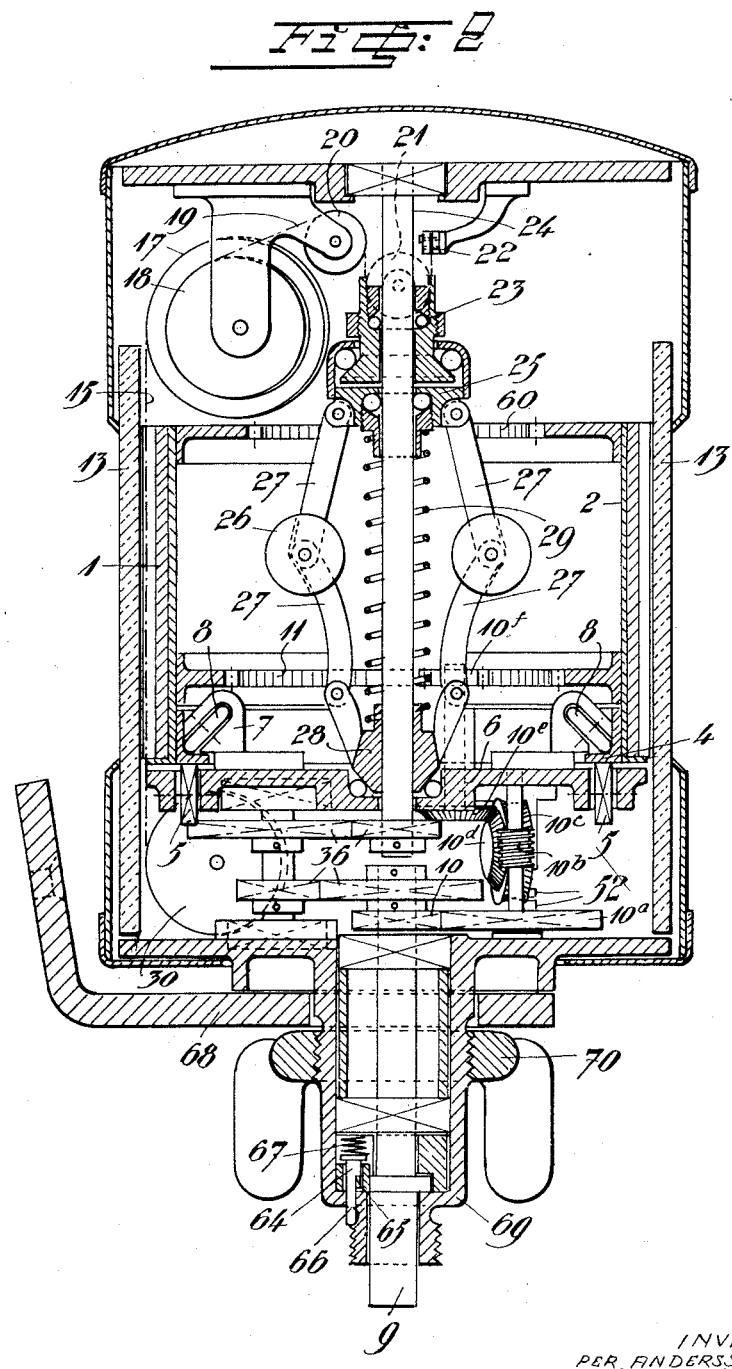
INVENTOR
PER ANDERSSON KOURTZMAN
BY Ruege, Boyer & Bakelar
ATTORNEYS Oct. 20, 1931. P. A. KOURTZMAN 1,827,988
SPEEDOMETER
Filed Jan. 31, 1929 5 Sheets-Sheet 3
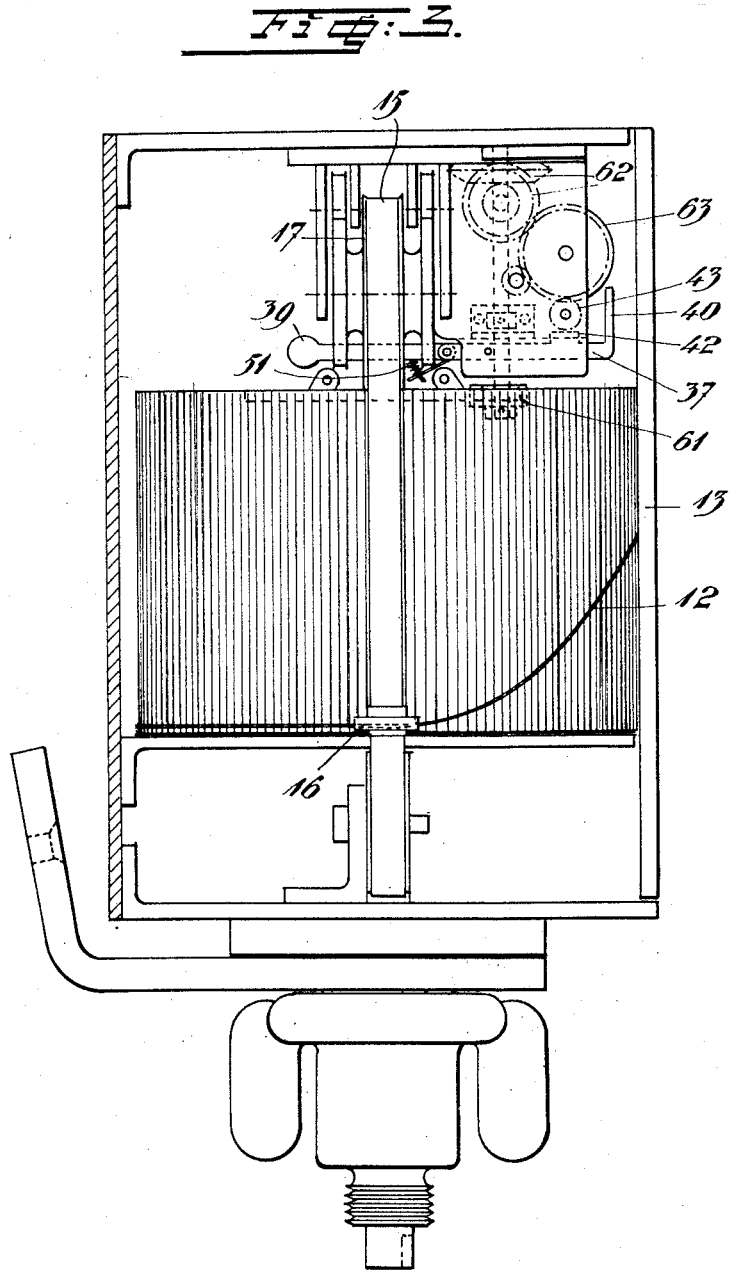
INVENTOR
PER ANDERSSON KOURTZMAN
BY Ruege, Boyce + Batelor
ATTORNEYS Oct. 20, 1931.   P. A. KOURTZMAN   1,827,988
SPEEDOMETER
Filed Jan. 31, 1929    5 Sheets-Sheet 4
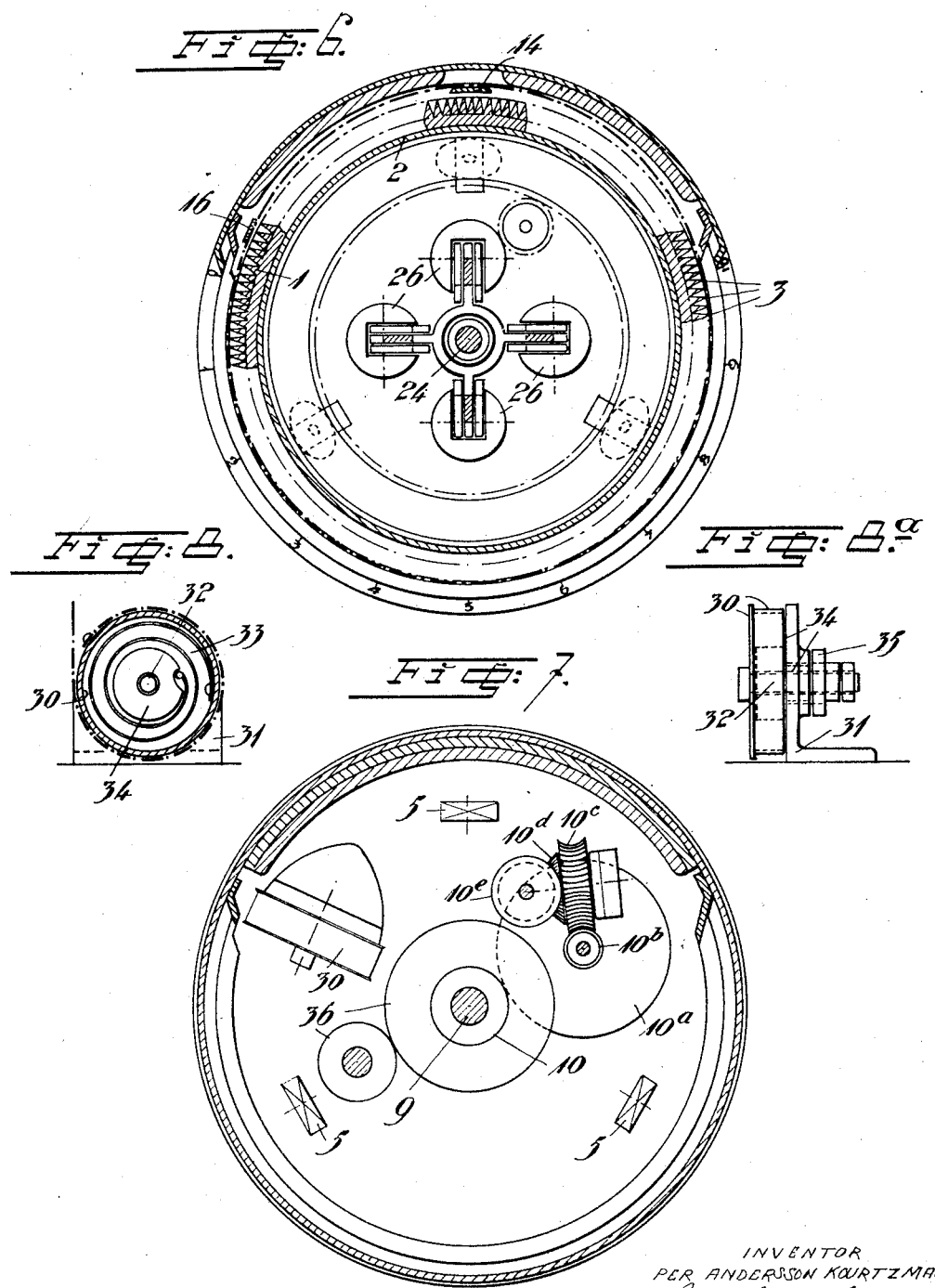
INVENTOR
PER ANDERSSON KOURTZMAN
ATTORNEYS Oct. 20, 1931.  P. A. KOURTZMAN  1,827,988
SPEEDOMETER
Filed Jan. 31, 1929  5 Sheets-Sheet 5
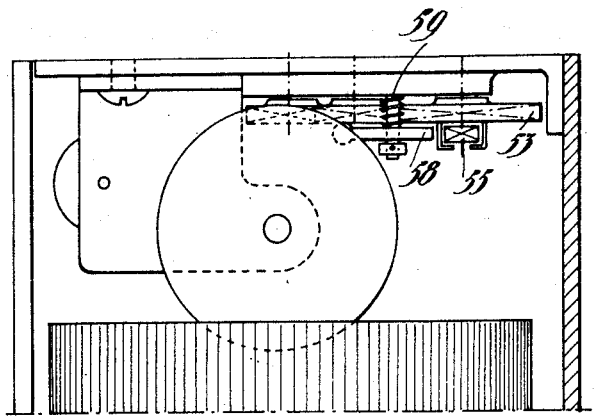
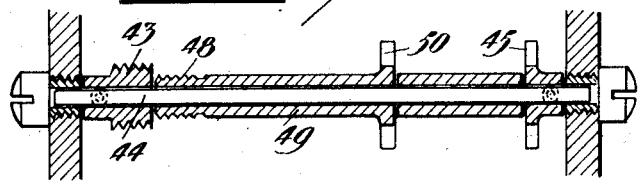
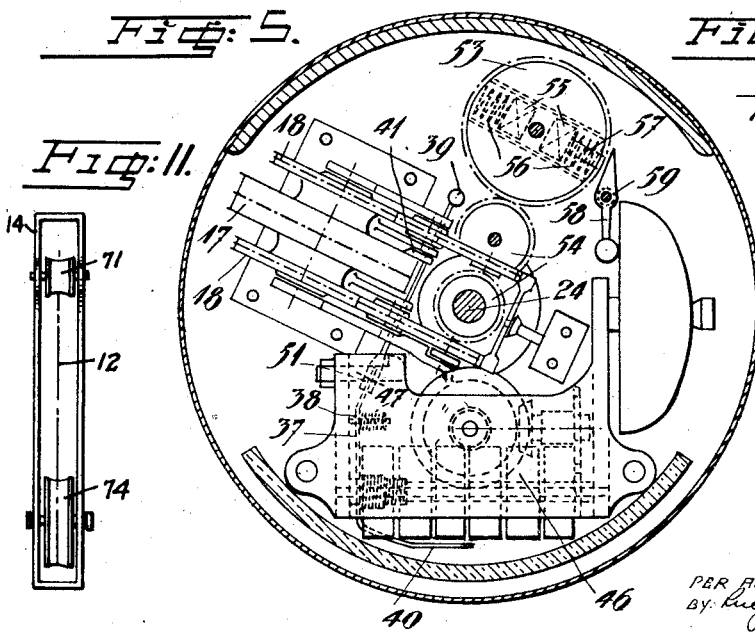
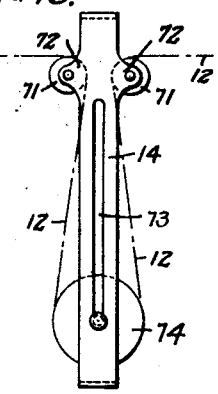
INVENTOR
PER ANDERSSON KOURTZMAN
BY Ruge, Boyce & Batcelor
ATTORNEYS Patented Oct. 20, 1931

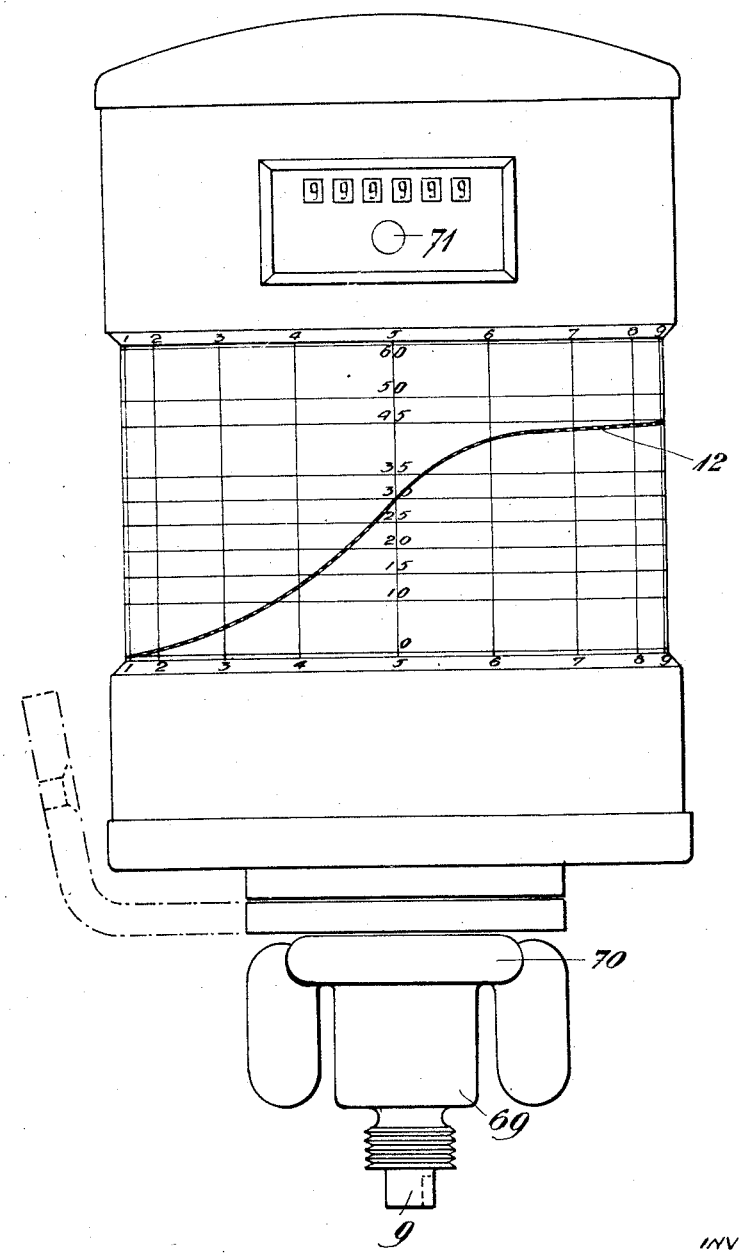

1,827,988

UNITED STATES PATENT OFFICE

PER ANDERSSON KOURTZMAN, OF VARTAN, SWEDEN

SPEEDOMETER

Application filed January 31, 1929, Serial No. 336,264, and in Sweden February 8, 1928.

The present invention relates to a speedometer for vehicles, which has partly a diagram cylinder rotating proportionally to the distance covered by the vehicle, upon one portion of which diagram cylinder a cord, chain, or the like is adjustable to the various speeds of the vehicle for the purpose of forming a speed diagram, partly a penalty sign, which marks any maximum speed exceeded by the vehicle, partly a clockwork which signals when the vehicle is approaching the said speed limit, partly a counting mechanism for indicating the distance covered, and partly a locking device for automatically locking the apparatus, on its being disconnected or disengaged from its driving device or mechanism on the vehicle. The aforesaid parts of the apparatus are meant to cooperate for the purpose of producing a complete apparatus, by means of which a particularly efficient check can be exercised. The characteristics of the invention consist of the special arrangements of the said parts, which will be quite obvious from the claims, which are illustrated by the following description of one form of construction of the apparatus with reference to the accompanying drawings.

On these drawings Fig. 1 shows the apparatus in elevation. Fig. 2 shows the apparatus in vertical section. Fig. 3 shows in elevation the rotary cylinder with the speed diagram, the adjustment device for the same, the counting mechanism and the penalty sign. Fig. 4 shows in elevation the clockwork. Fig. 5 shows the diagram adjustment device, the penalty sign, the clockwork and the counting mechanism seen from above. Fig. 6 shows a horizontal section of the apparatus through the rotary cylinder. Fig. 7 shows a horizontal section of the apparatus through the lower portion of the same. Figs. 8 and 8a are respectively a sectional side view and an edge view of a spring drum forming a part of the apparatus; Fig. 9 is a longitudinal sectional view illustrating a detail; and Figs. 10 and 11 are respectively a side view and an edge view illustrating still another detail of the apparatus.

In the example shown, the rotary diagram cylinder consists of a vertical outer casing 1 provided in its periphery with vertical grooves 3 (Fig. 6) and an inner metal drum 2 provided at its lower end with a flange 2ª on which the casing 1 rests. At the bottom of the casing 2 there is interiorly fixed a ring 4, by means of which the diagram cylinder is supported on rollers 5, which are journalled in a stationary disc 6, supporting bearings 7 for rollers 8, which rest against the inner corner of the ring 4. The diagram cylinder rotates on the rollers 5 and is during this process steered by the rollers 8 and its rotary motion is transmitted from the running wheels of the vehicle by means of a flexible shaft, which is connected up to a vertical shaft 9 journalled in the bottom of the apparatus. This shaft imparts to the diagram cylinder a rotation proportional to the distance covered by the vehicle through the agency of a train of gears 10, 10ª, 10ᵇ, 10ᶜ, 10ᵈ, 10ᵉ and 10ᶠ and a cogged ring 11 inside the diagram cylinder. Around the outer grooved surface of the diagram cylinder is laid an endless cord or chain 12, forming the diagram, and this cord or chain 12 is kept in position with a suitable pressure between the grooved surface of the diagram cylinder and a transparent fixed wall 13, e. g. of glass, which surrounds a portion of the diagram cylinder's circumference. As the length of that portion of the cord 12 which is visible through the glass wall 13 must vary according to its position on the diagram cylinder, there must be a device or arrangement which permits of this variation. By way of example, a device for accomplishing this is indicated diagrammatically at 14 in Fig. 6 and structurally in Figs. 10 and 11. This device may consist of a pair of guide rollers 71 mounted for rotation in fixed bearings 72 carried by a vertical frame 14, the side members of which are provided with elongated slots 73 in which are guided trunnion bearings extending from a roller 74 around which the cord 12 is looped in its passage from one roller 71 to the other. The roller 74 thus serves to take up the slack of the cord and give up said slack under the pull exerted on the cord by the upward movement of the band 15 hereinafter described.

The adjustment device for the cord will now be described. At one of the vertical edges of the glass wall 13 there is a band or a chain 15 movable in a vertical direction close to the diagram cylinder. To this band 15 is fastened a piece of tube 16, which carries along the cord 12 in the vertical motion of the band but permits it to run freely through the same. When the apparatus is in operation the piece of tube 16 moves with the band 15 up or down according to the various speeds of the vehicle, and carries along with it the cord 12 participating in the rotation of the diagram cylinder, the loop of the cord at 14 being shortened or lengthened. In this process the cord 12 will show a speed diagram of, by way of example, the form visible in Fig. 1, and the diagram cylinder is assumed to rotate from left to right. The band 15 lies with its upper end on a running wheel 17 journalled to fixed bearings, and is attached to this wheel 17. The running wheel 17 is attached to a couple of pulleys or sprocket wheels 18, to which are attached, cables 19, which run over rollers 20 journalled in fixed bearings, and over other rollers 21, and are made fast to a stationary bracket 22. The rollers 21 are journalled in a sleeve 23, which is slidable on an upper shaft 24 journalled in the apparatus and concentric with the shaft 9, but does not participate in its rotation. Another sleeve 25 on shaft 24 is slidable on the same together with the sleeve 23 but does participate in the rotation of shaft 24. The sleeve 25 forms part of a centrifugal device, which has several toggle links 27 equipped with weights 26, and these links 27 connect the sleeve 25 with a lower sleeve 28 attached to the shaft 24, the sleeve 28 being journalled by means of ball bearings to the fixed disc 6. The sleeves 23 and 25 are also journalled by ball bearings. A spiral spring 29 is located on the shaft 24 between the sleeves 25 and 28. The band 15 is secured at its lower end to a drum 30, and is attached to the latter. This latter is secured on a shaft 32 which is journalled in a bracket 31. The outer end of a flat spiral spring 33 is attached to the inner circumference of the drum, the inner end of this spiral spring 33 being attached to a roller 34 loosely located on the shaft, and the roller 34 by means of a nut 35 can be tightened against the bracket under different conditions of tension for the spring in relation to the centrifugal force. The shaft 24 is propelled by the shaft 9 with the agency of gears 36.

One of the arms of a double-armed lever 37, 39 journalled to a pin 38 supports the penalty sign 40. A projection 41 on the running wheel 17 (Fig. 5), on exceeding the speed limit, forces the other arm 39 of this lever downwards, so that the arm 37 is raised and the penalty sign becomes visible. In this connection a tooth 42 on the arm 37 engages a thick screw 43 (Figs. 3 and 9), which is attached to a rotary shaft 44 to which is attached a cog wheel 45, attached to one of the figure wheels marking the shortest distances in the counting mechanism 46. During the rotation of the shaft 44 the lever 37, 39 is in this process on account of the tooth's 42 engaging the screw 43 shifted on its pivot 38 against the action of a spring 47 towards the right in Fig. 5, making the penalty sign visible as long as the speed limit is being exceeded. If the maximum speed lasts beyond a certain distance, the tooth 42 is moved across to a narrower screw 48 on a rotary shaft 49 (Fig. 9), on which is located a cog wheel 50, which is attached to one of the figure wheels marking the longest distance in the counting mechanism 46, after which the penalty sign is kept in a visible position for a certain distance, inasmuch as the tooth is maintained in engagement with the screw 48 by reason of the fact that the arm 37 is supported on a friction surface disposed below and of the same length as said screw. The said friction surface is fully described in my copending application Serial No. 440,829, and since it is not of the essence of the invention herein, it has been omitted from the drawings for the sake of clarity. As soon as the arm 37 has passed beyond the said supporting surface, the arm will drop by gravity, thus carrying the penalty sign 40 out of view, whereupon the arm 37, under the action of spring 47, is returned to its initial position. Owing to the fact that the arm 39 is articulated and is actuated by a spring 51 the outer end of it can give way in the case of excessive speed, and obviate damage to the mechanism. An ordinary jaw-clutch 52 (only indicated in Fig. 2) enables the apparatus to stand still on backing.

The clockwork will now be described. On the underside of a cogwheel 53, journalled to the upper part of the apparatus, and operated by the shaft 24 by means of a gear 54, there are in radial guides located two diametrically opposed weights 55, which by centrifugal force are pressed outwards against the action of springs 56. One of these weights is provided with a pin 57, which at every revolution of the cogwheel 53 strikes against a clapper 58 actuated by a spring 59, when a certain speed has been exceeded by the vehicle, and makes the clapper strike against a bell and thus sound the alarm.

The counting mechanism is operated by the diagram cylinder through the agency of a cogged ring 60 inside the upper part of the same, a cogwheel 61, two cooperating bevelled wheels 62, and a cogwheel 63 cooperating with the cogwheel 45 (Figs. 5 and 9).

The locking device for automatically locking the apparatus on disconnecting it from its driving device on the vehicle consists of a bolt 64 slidable in the apparatus and which, when the apparatus is disconnected, fits into a groove 65 on the shaft 9, and which has a part 66 reaching outside the apparatus, which on the aforesaid flexible shaft's being connected with the shaft 9 is by the same moved out of the way with the entire bolt against the action of a spring 67, so that the bolt leaves the groove 65 and releases the shaft 9.

The apparatus is journalled on a base plate 68, which can be fixed to some suitable place, and has a pin-shaped part 69 projecting through the plate 68, and also a nut 70 screwed upon part 69 under the base plate, so that the apparatus can be turned into any suitable position and then locked by means of the nut 70 in this position.

An opening 71 in Fig. 1 serves for making the penalty sign visible.

The separate parts of the apparatus shown may of course be varied in many ways, provided only the characteristics of the invention are retained. The apparatus can be used on many different kinds of vehicles, e. g. motor cars, locomotives etc.

What I claim is:

1. A speedometer for vehicles, comprising a diagram cylinder mounted for rotation proportionately to the distance covered by the vehicle, a flexible member encircling said cylinder, a fixed transparent wall disposed adjacent to the cylinder, said cylinder being provided on its periphery with means for engaging said flexible member and retaining it between the cylinder and said wall, a band member traversing said cylinder in a direction at right angles to the direction of rotation of the cylinder, means carried by said band member in loose engagement with said flexible member, centrifugal means rotatable with the cylinder for moving said band member in one direction proportionately to the rotary movement of the cylinder, and means automatically operative to move the band member in the opposite direction.

2. A speedometer for vehicles, comprising a diagram cylinder mounted for rotation proportionately to the distance covered by the vehicle, a flexible member encircling said cylinder, a fixed transparent wall disposed adjacent to the cylinder, said cylinder being provided on its periphery with means for engaging said flexible member and retaining it between the cylinder and said wall, a band member traversing said cylinder in a direction at right angles to the direction of rotation of the cylinder, means carried by said band member in loose engagement with said flexible member, centrifugal means rotatable with the cylinder for moving said band member in one direction proportionately to the rotary movement of the cylinder, and a spring-actuated drum in engagement with the band member for moving it in the opposite direction.

3. A speedometer for vehicles, comprising a diagram cylinder mounted for rotation proportionately to the distance covered by the vehicle, a flexible member encircling said cylinder, a fixed transparent wall disposed adjacent to the cylinder, said cylinder being provided on its periphery with means for engaging said flexible member and retaining it between the cylinder and said wall, a band member traversing said cylinder in a direction at right angles to the direction of rotation of the cylinder, means carried by said band member in loose engagement with said flexible member, centrifugal means rotatable with the cylinder for moving said band member in one direction, and a spring-actuated drum in engagement with the band member thereby to place its spring under tension during movement of the band member under the action of said centrifugal means, said spring-drum being effective to move the band member in the opposite direction.

In testimony whereof I have signed my name to this specification.

PER ANDERSSON KOURTZMAN.